United States Patent [19]

Oh

[11] Patent Number: 5,595,352
[45] Date of Patent: Jan. 21, 1997

[54] BAIL ARM INVERTING APPARATUS FOR A FISHING REEL

[75] Inventor: Cheol S. Oh, Kyunggi-Do, Rep. of Korea

[73] Assignee: Shin A Sports Co., Ltd., Kimpo-Kun, Rep. of Korea

[21] Appl. No.: 237,005

[22] Filed: May 2, 1994

[30] Foreign Application Priority Data

Mar. 23, 1994 [KR] Rep. of Korea ............................. 5814

[51] Int. Cl.$^6$ ................................................. A01K 89/015
[52] U.S. Cl. ................................................................ 242/233
[58] Field of Search ..................................... 242/230, 231, 242/232, 233

[56] References Cited

U.S. PATENT DOCUMENTS 4,898,339  2/1990  Takeuchi ................................. 242/233
5,022,605  6/1991  Carlsson .................................. 242/233
5,301,898  4/1994  Ban et al. ................................ 242/233

FOREIGN PATENT DOCUMENTS 89-7945    9/1989   Rep. of Korea .
89-7946   11/1989   Rep. of Korea .
90-4026    6/1990   Rep. of Korea .
93-6352    9/1993   Rep. of Korea .

Primary Examiner—Katherine Matecki
Attorney, Agent, or Firm—Fish & Richardson P.C.

[57] ABSTRACT

A bail arm inverting apparatus for a fishing reel which includes a trigger lever, a link which reciprocates in a longitudinal direction when the trigger lever is pivoted, guiding structure for guiding the reciprocating movement of the link, and an arm-lever which is caused to pivot by sliding contact with the link. The number of components required for the apparatus is reduced, resulting in reduction of production cost and ensuring reliable operation of the apparatus.

8 Claims, 7 Drawing Sheets

PRIOR ART

FIG. 4

PRIOR ART

BAIL ARM INVERTING APPARATUS FOR A FISHING REEL

BACKGROUND OF THE INVENTION

1. Field of the Invention

The invention relates to a bail arm inverting apparatus for a fishing reel.

2. Description of the Prior Art

A bail serves to guide a fishing line so it does not get tangled when the fishing line is wound on to a spool. One end of the bail is fastened to an arm projecting from the rotor of the reel, and the other end of the bail is attached to an arm-lever support arm, projecting from the opposite side of the rotor, via an arm-lever. Thus, the bail is attached to and rotates as a unit with the rotor when the rotor is rotated. When the fishing line is thrown, the bail arm must be rotated to an inverted, throwing position, out of the way of the line, such that the fishing line is not obstructed and can unwind properly.

A typical example of a prior art bail arm inverting apparatus is disclosed in Korean Utility Model Publication No. 89-7945 in which a projection formed on the trigger lever pushes against operating part of the arm-lever. According to this apparatus, as the trigger lever is pulled up, the projection pushes the operating part of the arm lever forward and the arm-lever is caused to pivot to the throwing position. A tension spring is fastened to a portion of the arm-lever to increase the pivot angle of the arm-lever and to bias the arm-lever when the arm-lever is in its original, non-inverted winding position. In this apparatus, as the inverting motion and returning motion are repeated, fatigue hardening occurrs in the tension spring. While the tension spring is purported to be capable over 15,000 cycles, in actuality, function of the spring is decreased and ultimately fails after about 4,000 to 5,000 cycles due to the properties and heat treatment of the material.

Korean Utility Model Publication No. 90-4026 discloses an inverting apparatus which employs a gear mechanism. The apparatus increases the overall dimensions of the arm-lever support arm and the weight is partially concentrated. As a result, rotational balance of the rotor is destroyed and reliable operation of the reel is not realized.

Figure 1:
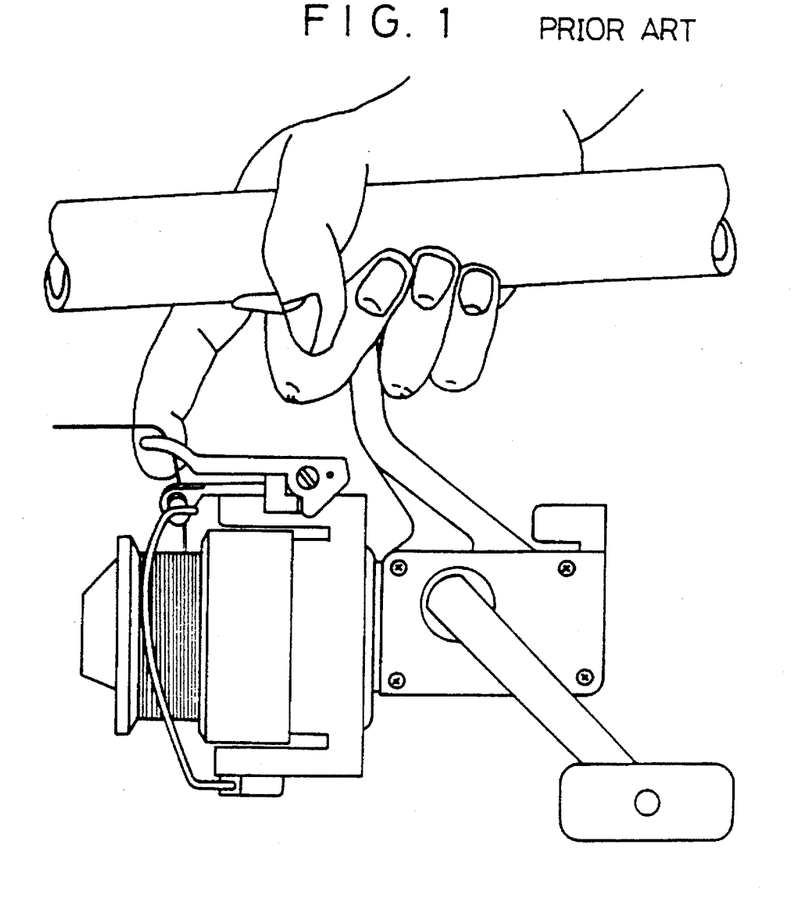
FIGS. 1 to 4 show the major working elements of a prior art bail arm inverting apparatus which employs a crank mechanism.
Figure 2:
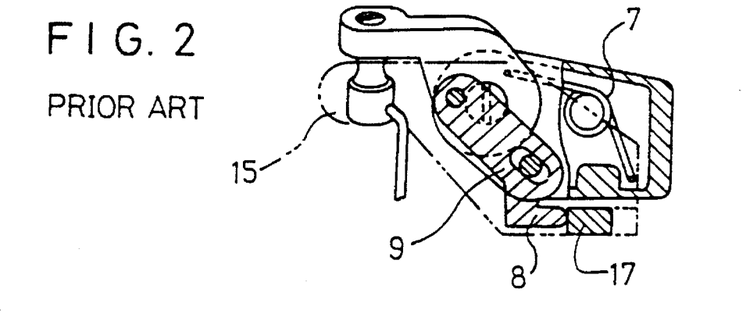
Figure 3:
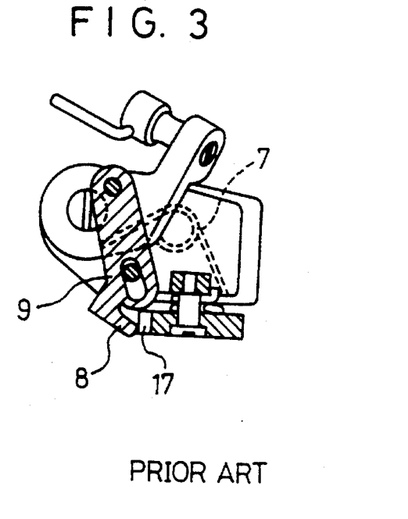
Figure 4:
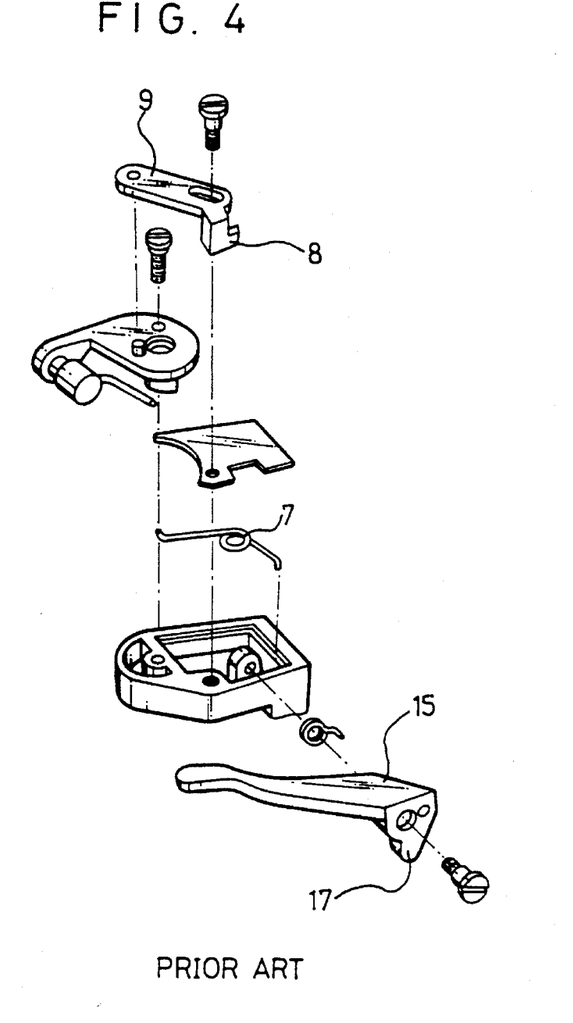

An inverting apparatus according to Korean Utility Model Publication No. 89-7946, as shown in FIGS. 1 to 4, uses a crank 9 to which the tension spring 7 is attached and on which a projection 8 is formed. In this apparatus, trigger lever 15 is pulled toward the fishing rod, i.e., upward as shown in FIG. 1 and into the plane of the page as shown in FIG. 2. The operating projection 17 formed on the opposite, non-pulled end of the lever 15 pushes against the projection 8 on the crank 9 and forces the bail-arm to pivot. Even if the apparatus of this Utility Model overcomes the problems encountered with the two above-mentioned apparatuses, it requires many components, much more labor and endeavor to assemble, and the original problem with respect to life of the tension spring 7 is still encountered.

Recently, as disclosed in Korean Patent Publication No. 93-6352, the apparatus gets popular approval in which, by the use of a link, the projecting pin integrally formed on one point of the surrounding portion adjacent to the axis of the arm-lever is pushed off to pivot the bail arm toward the throwing position. However, the apparatus still suffers from the fact that the apparatus requires many components, the operating part of the trigger lever is exposed to an outside, thereby a foreign material can to get between the parts, increasing failure factor, and the "thumb phenomenon" in which the link jumps over the boss to make the apparatus breakdown, occurrs.

SUMMARY OF THE INVENTION

The present invention is designed to overcome these various problems. An object of the present invention is to provide a bail arm inverting apparatus for a fishing reel which reduces the number of components required and which makes assembly easier, thereby ensuring reliable operation of the apparatus.

Another object of the present invention is to provide a bail arm inverting apparatus which prevents foreign material from getting between the parts of the apparatus and which smoothes the pivoting movement of the arm-lever over the desired range of motion.

Still another object of the present invention is to provide a bail arm inverting apparatus in which the pivoting movement of the trigger lever is limited to some extent.

Still another object of the present invention is to provide a bail arm inverting apparatus which prevents the user's finger from slipping when the finger-lever portion of the trigger lever is pulled.

According to one aspect of the present invention, there is provided a bail arm inverting apparatus for a fishing reel comprising a trigger lever support bracket integrally molded with an arm-lever support arm; a trigger lever with a link-engaging portion and a finger portion mounted directly to the bracket; a link member, one end of which maintains engaged, sliding contact with the link-engaging portion of the trigger lever and which reciprocates along guiding means formed integrally with the support arm; and an arm-lever with an integral push member mounted directly to the support arm, the arm-lever being caused to pivot by free, sliding, non-engaged contact between the link member and the push member.

As a result of these features, the number of components required is considerably reduced, assembly is simplified, production cost is reduced, and the force required for operation is also reduced.

According to another aspect of the present invention, longitudinal motion of the link member is effected within the closed space formed between the arm-lever fixing arm and a cover. Thus, failure due to contamination by foreign material is reduced.

According to another aspect of the present invention, the arm-lever has an integrally formed push member with a cam surface and which increases pivot angle of the arm lever and which ensures reliable pivoting movement of the arm lever.

According to another aspect of the present invention, there is provided first spring means for returning the trigger lever to its original, non-pulled position, and second spring means for returning the arm-lever to its original, non-inverted position.

According to still another aspect of the present invention, one end of the link member is slidably connected to the contact portion of the trigger lever such that the trigger lever and the link member are simultaneously returned to their original positions. According to the present invention, a projection is integrally formed in the distal end of the trigger lever such that when the trigger lever is pulled, accidental release of the trigger lever is prevented.

Also, according to the present invention, a stop member for limiting the pivoting movement of the trigger lever is provided.

DETAILED DESCRIPTION OF THE PREFERRED EMBODIMENTS

Figure 5:
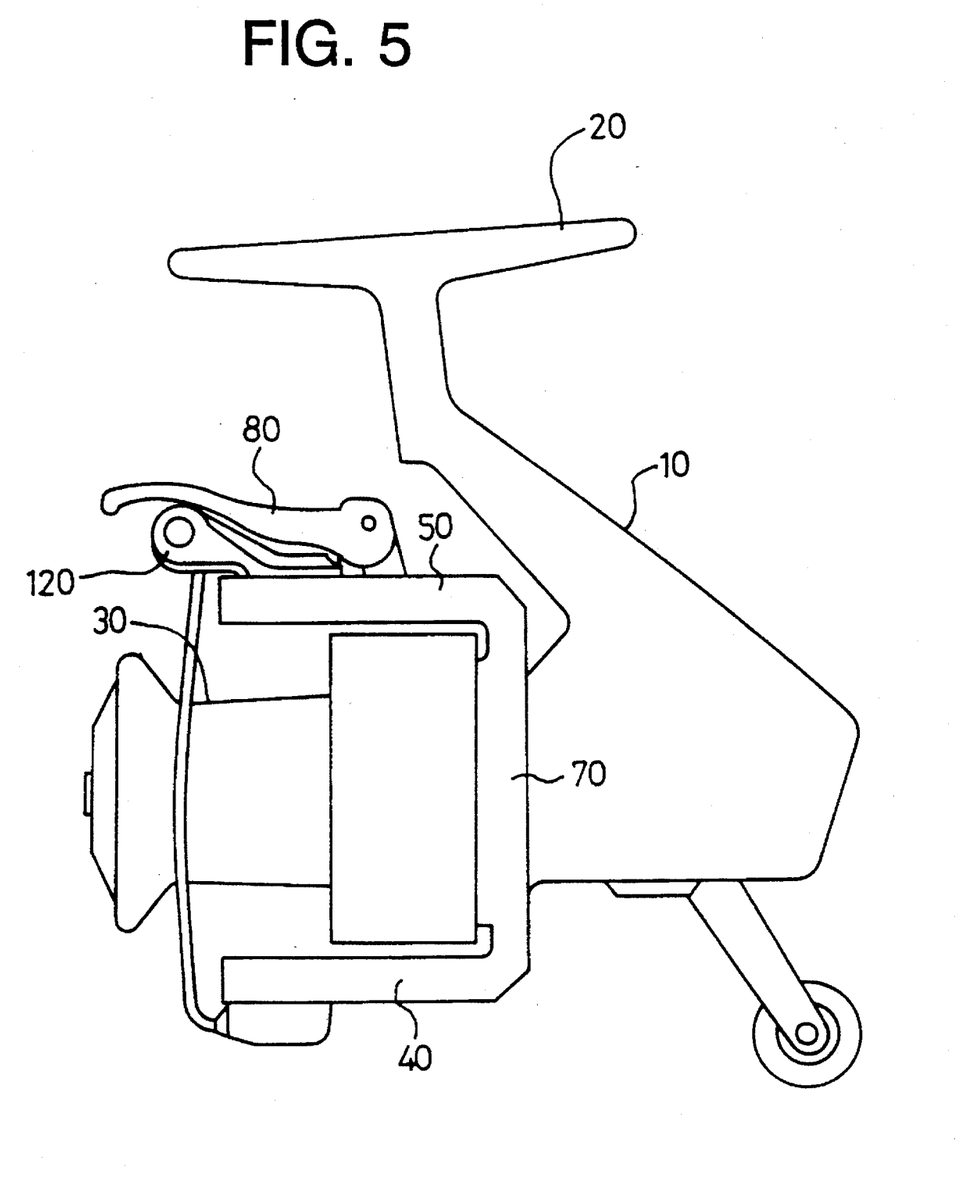
FIG. 5 is a side view showing the overall appearance of a fishing reel in which the bail arm inverting apparatus of the present invention is installed.

FIG. 5 shows the overall appearance of a fishing reel in which the bail arm inverting apparatus of the present invention is installed. The reel includes main body 10, which is attached to a fishing rod by part 20, and a rotor 70 which is rotatably mounted to the main body 10. The rotor 70 has an arm 40 and an opposed arm-lever support arm 50 integrally formed therewith. A spool 30 is rotatably fastened to the rotor 70. Arm lever 120 is shown without a line roller.

Figure 6:
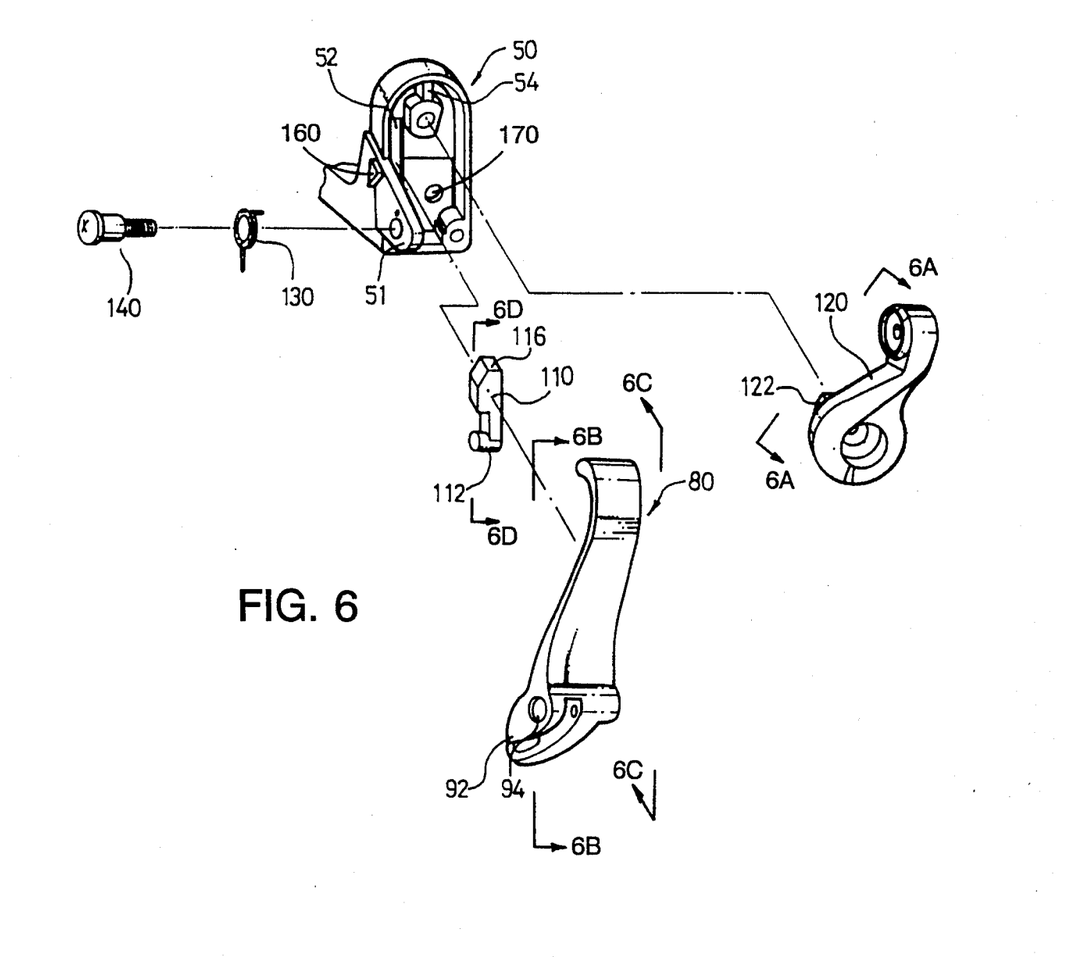
FIG. 6 is an exploded view of the bail arm inverting apparatus of the present invention.
Figure 6A:
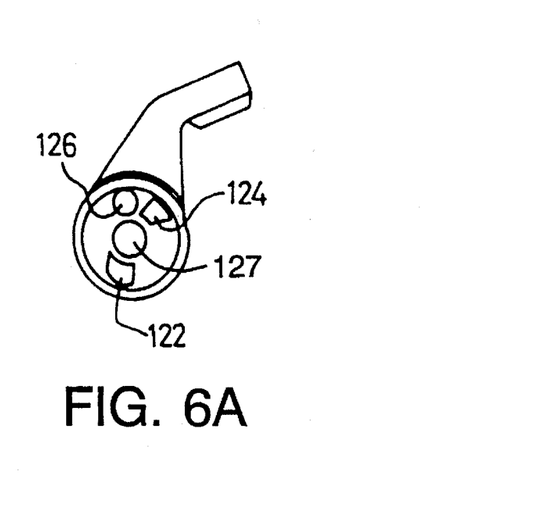
FIG. 6A is a reverse view of the arm-lever as seen along lines 6A—6A in FIG. 6.

Referring now to FIGS. 6–6D, there is illustrated an exploded view of a bail arm inverting apparatus according to the present invention. Arm-lever 120 is pivotally attached to the arm-lever support arm 50 of the rotor 70 by a shaft 127 (FIG. 6A).

Figure 6B:
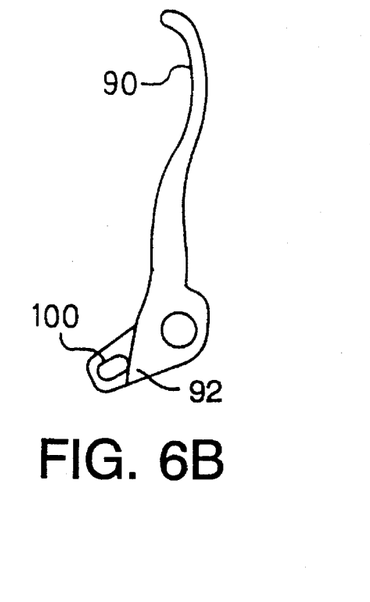
FIGS. 6B and 6C are side and plan views, respectively, of the trigger lever, as seen along lines 6B—6B and 6C—6C, respectively in FIG. 6.
Figure 6C:
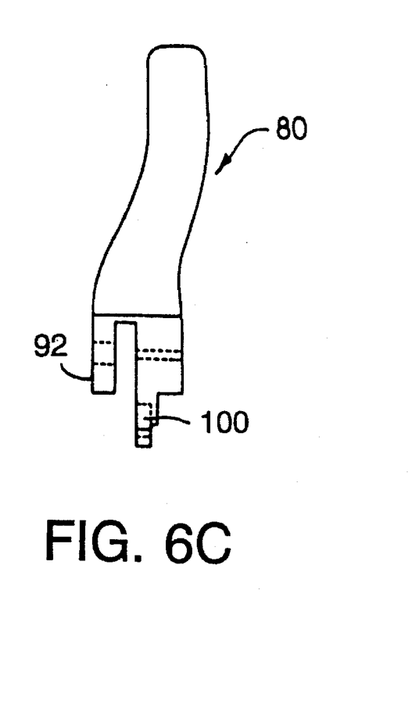

Trigger lever 80 includes a finger-lever portion 90, a slot 100 which receives a link 110, a stop 92, and a threaded hole 94. The distal end of the finger-lever portion 90 is downwardly projects down toward the rotor 70 such that the to prevent accidental release of the trigger lever 80 when it is being pulled. If excessive force is applied to the trigger lever 80, the stop 92 runs up against projection 160, which is integrally formed with the outer surface of the arm-lever support arm 50, and prevents the apparatus from being damaged.

Figure 6D:
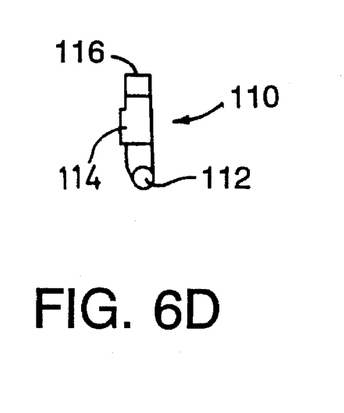
FIG. 6D is a side view of the link member as seen along lines 6D—6D in FIG. 6.

Link 110 is installed in the arm-lever support arm 50 so that pin portion 112 is received in slot 100 of the trigger lever 80 and guiding portion 114 fits into and slides along guide groove 52, which is formed in the arm-lever support arm 50. Because link 110 is positioned to fit within the guide groove 52, the possibility that the link 110 will be inadvertently detached from the desired position is eliminated. The trigger lever 80 is pivotally fastened to bracket 51 on the arm-lever support arm 50 by a screw 140, with one end of a first spring 130 being fitted into the bracket 51 and the other end being fitted into the trigger lever 80.

Figure 8:
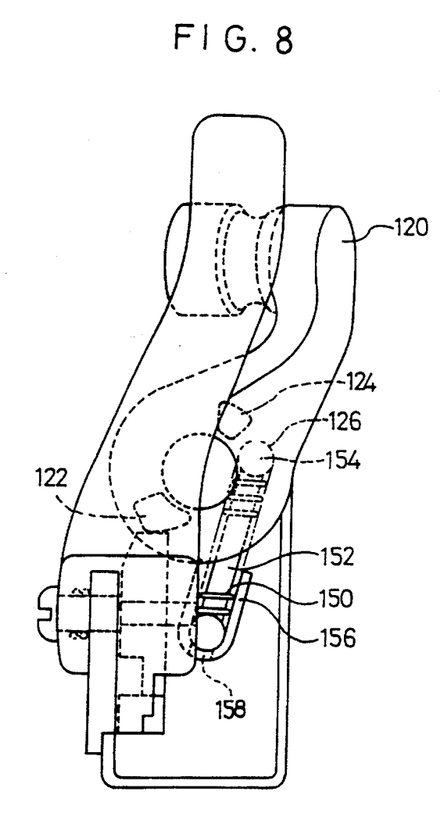
FIGS. 8, 9 are top views of FIG. 7, as seen along the lines 8,9—8,9, which illustrate the reciprocating motion of the link member and the pivoting motion of the arm-lever as the trigger lever moves between the winding position and the throwing position.
Figure 9:
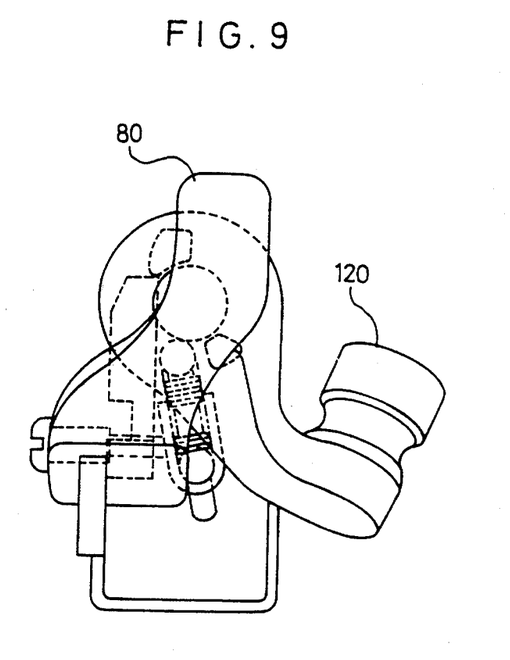

The arm-lever 120 includes cam portion 122 against which surface 116 of the link 110 pushes; stopping projection 124 which contacts stop member 54 formed in the arm-lever fixing support arm 50 to limit the counter-clockwise rotation of the arm-lever 120; and a hole 126 which receives the head portion 154 of a shaft 152 which supports a second spring 150 (FIGS. 8 and 9).

Spring support 156 having an opening 158 is pivotally fitted into the hole 170 which is formed in the lower part of the arm-lever support arm 50.

The entire structure is closed by a cover to prevent foreign material from getting between the parts.

The operating characteristics of the bail arm inverting apparatus of the present invention are described below with reference to FIG. 7 to 9.

Figure 7:
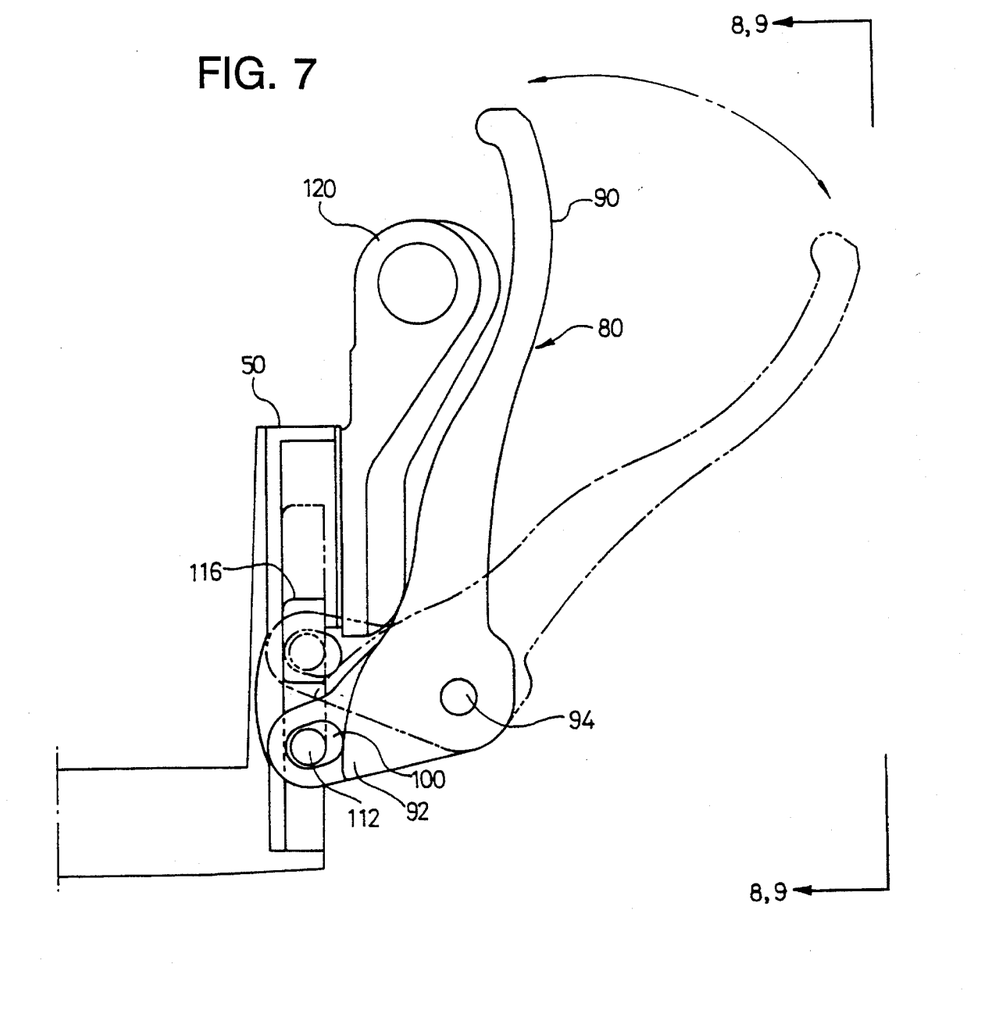
FIG. 7 as a schematic side view of the inverting apparatus of FIG. 5 which shows the operation of the inverting apparatus of the present invention.

As shown in FIGS. 7 and 8, when the trigger lever 80 is in its normal, non-pulled position, as shown by the solid line in FIG. 7, the arm lever 120 is in an upright, non-inverted position used when winding the reel ("winding position"). At this point, the surface 116 of the link 110 is positioned immediately below the cam portion 122 and is ready to push the cam portion 122 forward. The second spring 150 biases the stopping projection 124 against the stop member 54 of the arm-lever support arm 50.

Referring to FIGS. 7 and 9, when the trigger lever 80 is pulled toward the fishing rod, as indicated by the dashed lines in FIG. 7, the pin portion 112 of the link 110, which is received in the slot 100 of the trigger lever 80, slides in the slot 100 and moves forward. The surface 116 slidingly contacts and pushes the cam portion 122 of the arm-lever 120 so that the arm-lever 120 is pivoted in the clockwise direction, as shown in FIGS. 8 and 9. The second spring 150, which is fixed to the arm-lever 120, is forced to change its position, as shown in FIG. 9. Accordingly, the arm-lever 120 is moved to the position required when throwing the line ("the throwing position"), after which, by releasing the trigger lever 80 at the same time as the fishing line is thrown, the trigger lever 80 is returned to its original position by the biasing force of the first spring 130.

Because of the above-mentioned features of the invention, reliability of operation is ensured, the number of parts required for the apparatus is considerably reduced as compared to prior art apparatuses which use a link, assembly of the apparatus is performed in a more convenient manner, and production cost is reduced. Moreover, foreign material is prevented from getting between the parts, the trigger lever is returned to its original position easily, and the failure factor resulting from the use of the apparatus over a long time is reduced.

Although particular embodiments of the invention have been described and illustrated herein, it is recognized that modifications and variations may readily occur to those skilled in the art. Consequently, it is intended that the claims be interpreted to cover such modifications and equivalents thereof.

What is claimed is:

1. A bail arm inverting apparatus for a fishing reel, said fishing reel having a rotor with a longitudinal axis and being adapted to be attached to a fishing rod with the longitudinal axis aligned generally parallel to the fishing rod, said bail arm inverting apparatus comprising:

an arm-lever support arm extending from said rotor in a generally longitudinal direction and a trigger lever mounting bracket integrally molded with said arm-lever support arm;

a trigger lever pivotally mounted directly to said trigger lever mounting bracket, said trigger lever having a link-engaging portion and a distal, finger-lever portion;

a link member supported on said arm lever support arm, a first end of said link member being engaged with said link-engaging portion of said trigger lever in a manner that permits a limited range of engaged, sliding contact between said link member and said trigger lever, said link member being configured and disposed so as to reciprocate in a direction generally parallel to the longitudinal axis of the reel as said trigger lever pivots;

guide means formed integrally with said arm-lever support arm for guiding the reciprocation of the link member; and an arm-lever pivotally mounted directly to said arm-lever support arm, said arm-lever pivoting about a second axis disposed generally perpendicular to the longitudinal axis of the reel, said arm-lever having a push member attached directly to and extending therefrom at a position radially spaced from said second axis;

said trigger lever, said link member, and said arm-lever being disposed such that a second end of said link member makes free, sliding, non-engaged pushing contact with said push member when said trigger lever is pivoted whereby pivoting movement of said trigger lever causes pivoting movement of said arm-lever.

2. The bail arm inverting apparatus of claim 1, further comprising a first spring means for returning said trigger lever to a first, non-pivoted position from a second, pivoted position and a second spring means for returning said arm-lever to a third, non-pivoted position from a fourth, pivoted position.

3. The bail arm inverting apparatus of claim 1, further comprising stop means for limiting the pivotal movement of said trigger lever.

4. The bail arm inverting apparatus of claim 1, wherein a projection is integrally formed at an extreme part of said distal, finger-lever portion of said trigger lever such that accidental release of said trigger lever is prevented when said trigger lever is pulled.

5. The bail arm inverting apparatus of claim 1, wherein said guide means comprises a guiding portion formed integral with said link member and a groove defined in said arm-lever fixing arm, whereby dislocation of said link means is prevented during reciprocating movement of said link member.

6. The bail arm inverting apparatus of claim 1 further comprising a cover attached to said arm-lever support arm whereby reciprocating movement of said link member is effected within a closed space formed between said arm-lever support arm and said cover.

7. The bail arm inverting apparatus of claim 1 wherein said push member comprises a cam surface, said push member being integrally formed with an inward-facing surface of said arm-lever.

8. The bail arm inverting apparatus of claim 1 wherein said link-engaging portion of said trigger lever has a slot, said first end of said link member comprises a pin, and said pin is slidingly engaged in said slot.

* * * * *